(12) United States Patent
Setterberg et al.

(10) Patent No.: US 10,586,089 B2
(45) Date of Patent: Mar. 10, 2020

(54) METHOD AND FINGERPRINT SENSING SYSTEM FOR FORMING A FINGERPRINT IMAGE

(71) Applicant: Fingerprint Cards AB, Göteborg (SE)

(72) Inventors: Eric Setterberg, Västra Frölunda (SE); Hans Thörnblom, Kungsbacka (SE)

(73) Assignee: Fingerprint Cards AB, Gothenburg (SE)

( * ) Notice: Subject to any disclaimer, the term of this patent is extended or adjusted under 35 U.S.C. 154(b) by 0 days.

(21) Appl. No.: 15/359,014

(22) Filed: Nov. 22, 2016

(65) Prior Publication Data

US 2017/0169278 A1 Jun. 15, 2017

(30) Foreign Application Priority Data

Dec. 14, 2015 (SE) ..................................... 1551643

(51) Int. Cl.
 *G06K 9/00* (2006.01)
(52) U.S. Cl.
 CPC ....... *G06K 9/00026* (2013.01); *G06K 9/0002* (2013.01)
(58) Field of Classification Search
 CPC ........................ G06K 9/00026; G06K 9/0002
 USPC ...................................................... 382/124
 See application file for complete search history.

(56) References Cited

U.S. PATENT DOCUMENTS

| 6,990,218 | B2 | 1/2006 | Wirtz | |
| 2003/0068073 | A1* | 4/2003 | Wirtz | G06K 9/0002 382/124 |
| 2005/0163394 | A1* | 7/2005 | Scholze | G06K 9/00067 382/260 |
| 2005/0238211 | A1* | 10/2005 | Du | G06K 9/00026 382/124 |
| 2009/0020611 | A1* | 1/2009 | Sackett | G06K 7/10722 235/462.08 |
| 2010/0020157 | A1* | 1/2010 | Jelinek | G06K 9/00026 348/36 |
| 2010/0321481 | A1 | 12/2010 | Morin et al. | |
| 2014/0003677 | A1 | 1/2014 | Han et al. | |
| 2014/0003682 | A1* | 1/2014 | Vieta | G06K 9/00013 382/124 |
| 2016/0307023 | A1* | 10/2016 | Kim | G06F 16/5838 |

FOREIGN PATENT DOCUMENTS

| WO | 9926187 A1 | 5/1999 |
| WO | 2011093994 A1 | 8/2011 |

OTHER PUBLICATIONS

International Search Report for International Application No. PCT/SE2016/051208 dated Mar. 21, 2017, 6 pages.

(Continued)

*Primary Examiner* — Justin P. Misleh
(74) *Attorney, Agent, or Firm* — RMCK Law Group, PLC

(57) ABSTRACT

The present invention generally relates to a method forming a fingerprint image using a fingerprint sensing system, and specifically the formation of an improved fingerprint image by combining fingerprint image data from a plurality of subsequently acquired images of a finger. The invention also relates to a corresponding fingerprint sensing system and to a computer program product.

16 Claims, 4 Drawing Sheets

(56) References Cited

OTHER PUBLICATIONS

Kukula, E., et al., "The impact of fingerprint force on image quality and the detection of minutiae", Electro/Information Technology, 2007 IEEE International Conference, pp. 432-437 (2007).
Extended European Search Report dated Jun. 12, 2019 for EP Application No. 16876144.3, 7 pages.

* cited by examiner

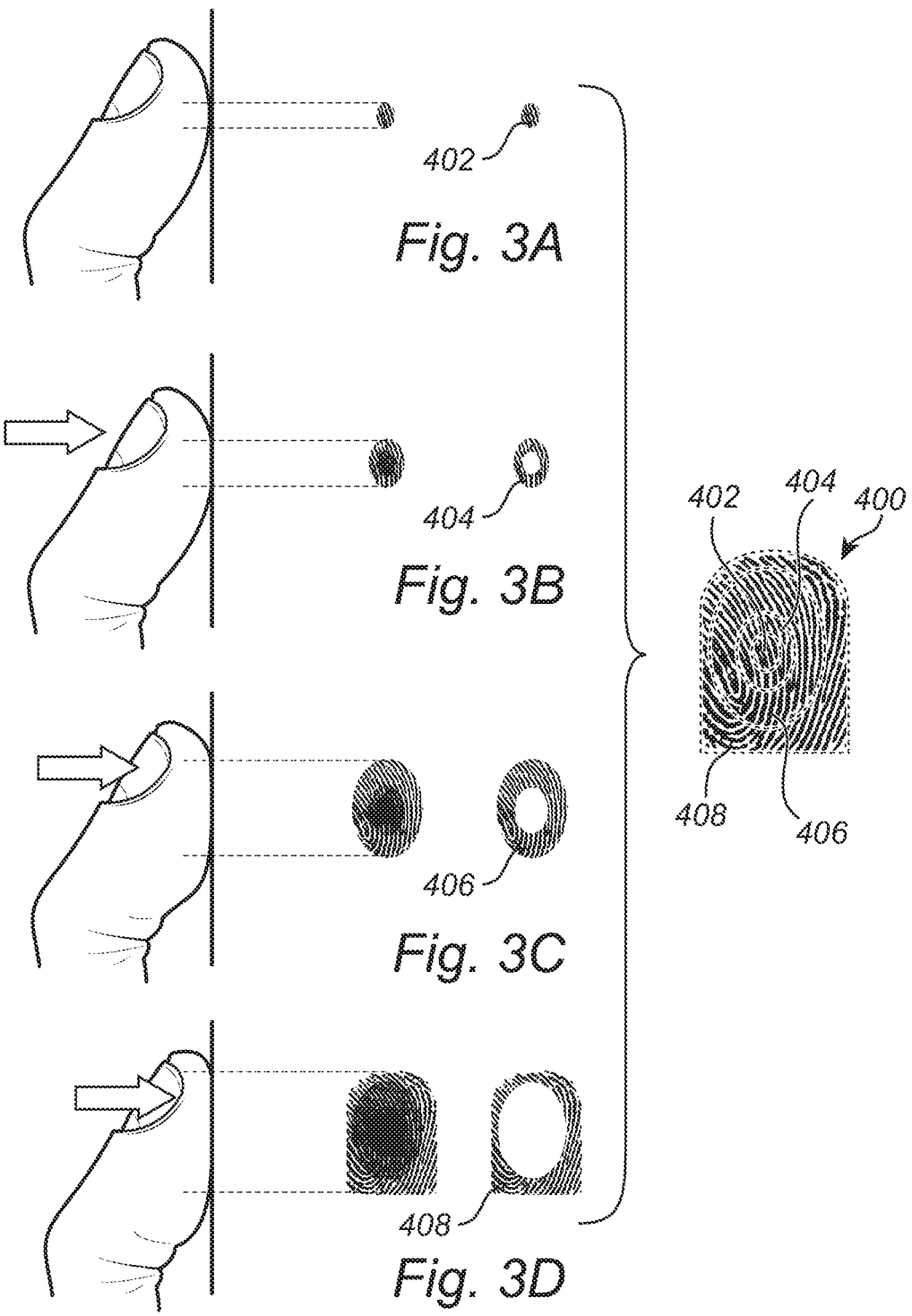

METHOD AND FINGERPRINT SENSING SYSTEM FOR FORMING A FINGERPRINT IMAGE

CROSS REFERENCE TO RELATED APPLICATIONS

This application claims the benefit of Swedish Patent Application No. 1551643-8 filed Dec. 14, 2015. The disclosure of the above application is incorporated herein by reference in its entirety.

FIELD

The present invention generally relates to a method forming a fingerprint image using a fingerprint sensing system, and specifically the formation of an improved fingerprint image by combining fingerprint image data from a plurality of subsequently acquired images of a finger. The invention also relates to a corresponding fingerprint sensing system and to a computer program product.

BACKGROUND

Various types of biometric systems are used more and more in order to provide an increased security for accessing an electronic device and at the same time keep the user convenience at an acceptable level. In particular fingerprint sensors have been successfully integrated in such devices, for example, thanks to their small form factor, high performance and user acceptance. Among the various available fingerprint sensing principles (such as capacitive, optical, thermal etc.), capacitive sensing is most commonly used, in particular in applications where size and power consumption are important.

All capacitive fingerprint sensors provide an indicative measure of the capacitance between several sensing elements and a finger placed on the surface of the fingerprint sensor. Acquisition of a fingerprint image is typically performed using a fingerprint sensor comprising a plurality of sensing elements arranged in a two-dimensional manner, and a block based technique may be applied to the fingerprint sensor for acquiring a fingerprint image, where the blocks of sensing elements are sampled sequentially.

One of the problems associated with fingerprint sensors concerns the reliable and accurate transformation of the ridge-valley pattern of the fingertip into electrical signals. That is, the image quality achieved by the fingerprint sensor, in particular contrast and brightness, depends on how good the connection is to the image which brings about the measured changes in capacitance, in particular—in the case of a fingerprint sensor which is principally of interest here—how firmly a fingertip is placed on to the bearing area of the fingerprint sensor. If the finger is only placed lightly thereon, then a fingerprint image is produced which has a small area and only a small amount of dark gray components. If the finger is pressed firmly on to the sensor, then the area of the fingerprint image is increased and the gray components in the image are shifted toward darker values. When the finger reaches a short distance from the fingerprint sensor during placement onto the surface of the fingerprint sensor, an as yet incomplete fingerprint image can already be generated since the capacitance of the conductor areas that is measured with respect to the skin surface can already make up a difference with respect to the basic state of the fingerprint sensor.

There is thus of high importance to be able to acquire a fingerprint image at "the right time" when the finger is placed onto the fingerprint sensor. An exemplary implementation for trying to overcome this problem is disclosed in U.S. Pat. No. 6,990,218. U.S. Pat. No. 6,990,218 provides a method adapted to select an image that is best suited to further processing from a sequence of images that are recorded in short succession one after the other by the sensor. The image is selected based on the criteria that it is the image that most likely corresponds to a typical fingerprint. The selected image is further improved by subtracting a correction image from the selected image, where the correction image is essentially formed to represent background disturbances when acquiring the sequence of images.

Even though U.S. Pat. No. 6,990,218 introduces an interesting approach to improving the timing when acquiring a fingerprint image as well as for reducing disturbances within the image, U.S. Pat. No. 6,990,218 discards possibly valuable information. Thus, there appears to be room for further improvement in regards to fingerprint image acquisition during placement of a finger onto a fingerprint sensor.

SUMMARY OF THE INVENTION

In view of above-mentioned and other drawbacks of the prior art, it is an object of the present invention to provide an improved method for acquiring a fingerprint image using a fingerprint authentication system. In particular, the present inventors have found that it may be desirable to take into account the inherent features of how a finger is behaving when being placed onto a fingerprint sensor.

According to an aspect of the present invention, it is therefore provided a method of forming a fingerprint image of a finger by means of a fingerprint sensing system comprising a fingerprint touch sensor and processing circuitry connected to the fingerprint touch sensor, wherein the method comprises the steps of acquiring a sequence of images of the finger at different stages of depression of the finger when the finger is contacting the fingerprint touch sensor, selecting a portion of the sequence of images, wherein the selected portion of images all comprises information illustrating the finger, and forming the fingerprint image by combining fingerprint image information comprised with the selected portion of images of the finger.

The present invention is based upon the realization that a finger during the event of contacting the fingerprint sensor will be somewhat depressed, i.e. the ridge-valley pattern will be slightly distorted when the finger is pressed to the active surface of the fingerprint sensor. Specifically, the inherent physical behavior of the fingerprint is that the ridges of the fingerprint will be slightly flattened when the fingerprint is pressed onto the fingerprint sensor, thus also making the valleys of the fingerprint narrower. However, the exact physical behavior will be different between different users. The exact amount of deformation/depression will of course also depend on the amount of pressure the finger is pressed towards the fingerprint sensor.

In accordance to the invention, a sequence of images of the finger is taken during a time period extending at least from when the finger is "approaching" (small contact with fingerprint sensor) until the finger is in full contact with the fingerprint sensor. Thus, a sequence of images will capture the finger at different stages of depression when contacting the fingerprint sensor. As the depression/deformation will vary for different portions the finger during the contact with the fingerprint sensor, "the right time" as mentioned above will typically not be the same for all portions of the finger.

Typically, the central portion of the fingertip will be depressed firstly, followed by portions moving outwards from the center of the fingertip. In accordance to the invention, it is therefore desirable to acquire an image (within the sequence of imaged) as close as possible to when the finger is initially contacting the fingerprint sensor. Preferably, it may in some embodiment of the present disclosure be suitable to acquire all images in the sequence of images using the same (or similar) sensor setting. That is, rather than adjusting the sensor setting, such as e.g. a gain level, for each of the acquired images in the sequence of images, the same gain level is used for all of the acquired images. This is typically contrary to the approach used in accordance to prior art, where a specific "gain control pattern" may be applied (such as low gain for the first image, a slightly higher gain for the second image, an even higher gain for the third image, etc.).

With the explained understanding of how the finger will "physically behave" when contacting the fingerprint sensor and by capturing the finger during the full process of approach-contact with the fingerprint sensor, it will be possible to form an improved fingerprint image. The improvement in accordance to the invention achieved by combining at least parts of each of the acquired fingerprint images. The concept of combining image data from the sequence of images will be further elaborated below.

In a typical implementation of the invention, during an acquisition phase for acquiring said sequence of images, some of the images may for example be captured "too early". In accordance to the invention, a selection is performed to typically exclude images not holding information about the finger. As such, e.g. empty images just including background noise from the fingerprint sensor will not be included when forming the fingerprint image.

It should be emphasized that the sequence of images consecutive acquired within a time frame defined by a single event of the finger being placed onto the fingerprint touch sensor. This will as explained above correspond to the time period extending at least from when the finger is "approaching" (small contact with fingerprint sensor) until the finger is in full contact with the fingerprint sensor. In addition, this time period for acquiring images should not be confused with a prior-art approach of acquiring more than a single image once the finger is placed firmly on the sensor. Rather, the inventive process will as a comparison acquire images also and already before the finger is placed firmly at the fingerprint sensor.

It should be understood that the fingerprint sensor is a so called "touch fingerprint sensor", i.e. not a swipe sensor where a plurality of images are sequentially acquired and then stitched together for forming a full fingerprint image. In accordance to the invention, the finger is rather pressed to the fingerprint sensor from an elevated position towards the touch sensor, i.e. not swiped over the sensor area (as with a swipe sensor).

As stated above, a selection of images (all comprising information illustrating the finger) are used for forming the fingerprint image, by combining at least some information comprised with each of the selected images. The combination may in one embodiment of the invention be a straight forward in that the values for corresponding pixels of the acquired fingerprint images are summarized or fused. The idea is to use the selection of images and combine information from each of the selection of images into the formed single "synthesized" fingerprint image.

It may also be possible to take a more complex approach by analyzing each of the selection of images and determine which section of each of the selection of images that provide valuable information to be used once combined into the formed single fingerprint image. The analysis and determination may for example be performed by evaluating if information satisfies a predetermined quality metric. Alternatively, it may be possible to combine a predetermined section (area) from each of selected images, where the predetermined section (area) is at least partly different for each of the selected images. In a possible embodiment, the predetermined section (area) is dependent on a position within the sequence of acquisition.

As an example, it may be possible to start by selecting a central section/area of an early acquired image within the sequence and then in a "ring based manner" (not necessarily circular) acquire sections/areas further towards the outside edges of the fingerprint sensor later within the sequence of acquired fingerprint images. In such an implementation, the idea is to capture portions of the finger in an only minor depressed state, with the expectation that the central portions of the fingertip will be more and more depressed later in the sequence of acquired images. The combined fingerprint image will thus in such an implementation include sections of the fingerprint in a non-depressed state.

It should be understood that it may be of great advantage to make use of the knowledge of the specific sequence in which the images have been acquired, combined with information relating to an approximate "distance in time" between then the images were acquired. This information may in combination be used for forming a depth profile of the finger, e.g. as typically the central portion of the fingertip is first contacting the fingerprint sensor, followed by the "outer sections" of the finger. The depth profile for the finger may in one embodiment be used for authentication purposes. In an embodiment, the duration between acquiring two images of the sequence of images of the finger is less than 50 ms, preferably less than 25, most preferably less than 10. The sequence of images preferably comprises at least three images, preferably more and typically depending on the type of fingerprint sensor and the planned implementation.

In accordance to the invention, it may in one embodiment be possible to decrease the time period between two consecutively acquired images (within the sequence of image) by acquire the images with e.g. a lower "resolution", by acquiring partial images, or by acquiring images e.g. where only every second pixel of the fingerprint sensor is activated for each acquired image (sub-sampling). In case of sub-sampling it could be possible to allow the selection of active pixels to be shifted between sequentially acquired images of the image sequence. The fingerprint sensor may thereby be configured to acquire fingerprint images at a higher speed as compared to an implementation where only "full" images are acquired.

In addition, it is to be understood that the formed fingerprint image typically is used by for allowing enrollment of the finger and subsequent authentication of the finger. The formed fingerprint may also be used for identifying a user related to the finger (the user's finger). Further e.g. image processing may also be performed once the fingerprint image has been formed for allowing further improvements of the fingerprint image.

Within the context of the invention, the expression "fingerprint image" should be interpreted broadly and to include both a regular "visual image" of a fingerprint of a finger as well as a set of measurements relating to the finger when acquired using the fingerprint sensor. In addition, the expression "processing circuitry" should be understood to include any type of computing device, such as an ASIC, a microprocessor, etc. It should also be understood that the actual implementation of such a processing circuitry may be divided between a plurality of devices/circuits.

According to another aspect of the present invention, there is provided a fingerprint sensing system, comprising a fingerprint touch sensor, a memory, and processing circuitry connected to the fingerprint sensor for acquiring a sequence of images of the finger at different stages of depression of the finger when the finger is contacting the fingerprint touch sensor, selecting a portion of the sequence of images, wherein the selected portion of images all comprises information illustrating the finger, and forming the fingerprint image by combining fingerprint image information comprised with the selected portion of images of the finger. This aspect of the invention provides similar advantages as discussed above in relation to the previous aspect of the invention.

The fingerprint sensor may, as indicated above, be implemented using any kind of current or future fingerprint sensing principle, including for example capacitive, optical, or thermal sensing technology. However, at present capacitive sensing is most preferred. Both one and two-dimensional sensors are possible and within the scope of the invention.

The fingerprint sensing system preferably forms part of an electronic device further comprising a device controller for performing an authentication of the finger based on the at least one selected fingerprint image, and performing at least one action only if the authentication indicates an authentication success. Such an action may for example be for unlocking a locked portable device, e.g. in case the portable device is a mobile phone. The at least one action may of course be any type of action suitably used when there is a need to authenticate a finger.

According to a further aspect of the present invention, there is provided a computer program product comprising a computer readable medium having stored thereon computer program means for controlling a portable electronic device, the portable electronic device comprising a fingerprint sensing system including a fingerprint touch sensor and processing circuitry, the fingerprint sensing system adapted to form a fingerprint image of a finger, wherein the computer program product comprises code for acquiring a sequence of images of the finger at different stages of depression of the finger when the finger is contacting the fingerprint touch sensor, code for selecting a portion of the sequence of images, wherein the selected portion of images all comprises information illustrating the finger, and code for forming the fingerprint image by combining fingerprint image information comprised with the selected portion of images of the finger. Also this aspect of the invention provides similar advantages as discussed above in relation to the previous aspects of the invention.

In summary, the present invention generally relates to a method forming a fingerprint image using a fingerprint sensing system, and specifically the formation of an improved fingerprint image by combining fingerprint image data from a plurality of subsequently acquired images of a finger. The invention also relates to a corresponding fingerprint sensing system and to a computer program product. Advantages of the invention includes the possibility of creating a combined fingerprint image formed by highlighting specifically interesting areas of each of a plurality of sequentially acquired images, acquired in when the finger is initially contacting the fingerprint sensor.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which:

FIGS. 3A-3D illustrate different stages of depression of a finger contacting the fingerprint sensor;

DETAILED DESCRIPTION

Figure 1:
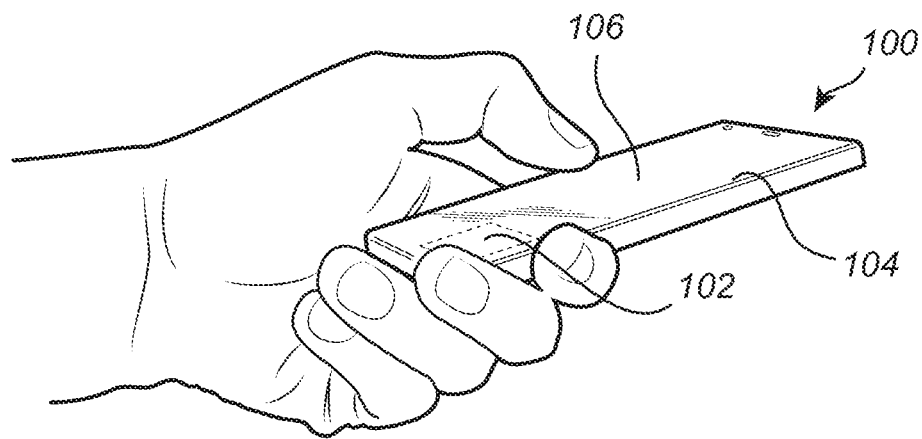
FIG. 1 schematically exemplify an electronic device according to the present invention, in the form of a mobile phone comprising an integrated fingerprint sensor.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Turning now to the drawings and to FIG. 1 in particular, there is schematically illustrated the electronic device according to the present invention, in the form of a mobile phone 100 with an integrated fingerprint sensor 102 and a display unit 104 with a touch screen interface 106. In this embodiment the fingerprint sensor 102 and the display unit 104 are together arranged at the front side of the mobile phone 100. The fingerprint sensor 102 may, for example, be used for unlocking the mobile phone 100 and/or for authorizing transactions carried out using the mobile phone 100, etc. The fingerprint sensor 102 may of course also be placed on the backside of the mobile phone 100.

Preferably and as is apparent for the skilled person, the mobile phone 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile phone. It should furthermore be noted that the invention may be applicable in relation to any other type of portable electronic device, such as a laptop, a remote control, a tablet computer, or any other type of present or future similarly configured device.

Figure 2:
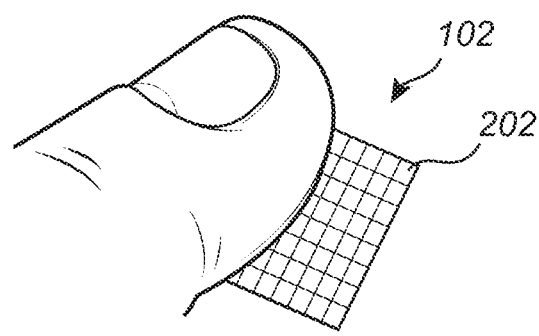
FIG. 2 schematically shows the fingerprint sensor array comprised in the electronic device in FIG. 1.

With reference to FIG. 2, there is conceptually illustrated a somewhat enlarged view of the fingerprint sensor 102. In the case of employing a capacitive sensing technology, the fingerprint sensor 102 is configured to comprise a large plurality of sensing elements, preferably arranged as a two-dimensional array. The two-dimensional array may have sizes depending on the planned implementation and in an embodiment 160×160 pixels are used. Other sizes are of course possible and within the scope of the invention, including two-dimensional array with less pixels as compared to the above example. A single sensing element (also denoted as a pixel) is in FIG. 2 indicated by reference numeral 202.

FIGS. 3A-3D exemplify four images that have been sequentially acquired when a user places his finger in contact with a fingerprint sensor 102. The first image in FIG. 3A has been acquired just as the finger is making contact with the fingerprint sensor 102. As will be understood from the illustration, the central portion of the fingertip is here making contact with the sensor 102. The central portion of the fingertip will in FIG. 3A be acquired prior to any distinctive deformation has been made to the fingertip, the reason being that the pressure for the central portion of the fingertip is relatively low, and thus the ridges have not been flattened out yet.

In FIG. 3B the pressure has been increased at the central portion of the fingertip, making the central portion of the finger a bit less distinctive as compared to the central portion of the finger as illustrated in FIG. 3A. However, a second portion of the finger surrounding the central portion of the fingertip is not yet in such "pressurized" contact with the fingerprint sensor 102, thus making it clear and distinctive. Thus, the second portion of the finger will, at the point in time of acquiring the second image, provide a suitable candidate the final fingerprint image. Thus, the part of the second image corresponding to the second portion of the finger is of most importance.

In a similar manner as is shown in FIGS. 3C and 3D, a third and a fourth portion of the finger will be further introduced with the third and the fourth of the acquired images within the image sequence. Corresponding portions of the third and the fourth image will provided suitable image portions for the final fingerprint image.

Figures 4A, 4B:
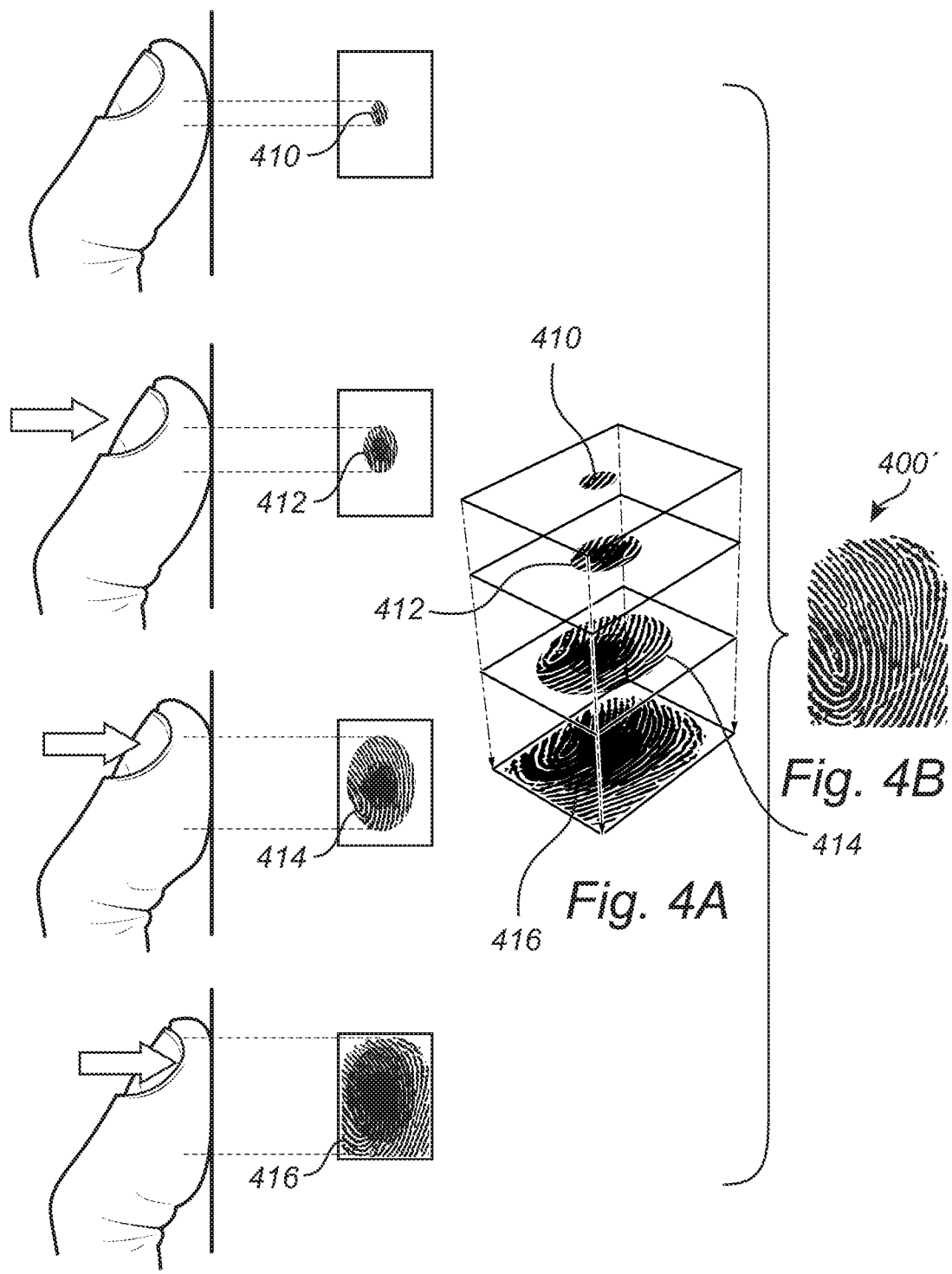
FIGS. 4A and 4B show a single fingerprint image formed by combining image data.

FIG. 4A conceptually illustrates how data from the individual images of the image sequence (e.g. FIGS. 3A-3D) could be combined for forming a first version, 400, of the final fingerprint image. In this first embodiment, the only a selected sub-section of the acquired images are combined for forming the fingerprint image 400. For example, a predefined sub-section 402 corresponding to only the central portion of the fingertip may be defined for use with the firstly (FIG. 3A) acquired fingerprint image with the sequence of images. Similarly, a second 404, a third 406 and a fourth 408 sub-section may be defined for the secondly, thirdly and fourthly acquired image, respectively (FIGS. 3B-3D). The second 404, the third 406 and the fourth 408 sub-section will in the first embodiment shown in FIG. 4A exclude the previous sub-sections, however not completely but rather with a small overlap. It should be understood that the sub-sections 402, 404, 406 and 408 may be defined differently. Possibly, the sub-sections could be defined "on the fly" based on a quality metric for the acquired images.

In FIG. 4B there is similarly conceptually illustrated how data from the individual images of the image sequence (e.g. FIGS. 3A-3D) could be combined for forming a second version, 400', of the final fingerprint image. In this second embodiment "all" of the image data from each of the four images (e.g. FIGS. 3A-3D) is combined to form the second version of the fingerprint image 400'. Here, the subsections, 410, 412, 414, and 416 are instead defined as to correspond to the entire finger contacting the fingerprint sensor 102 at the point in time when each of the images of the image sequence is acquired.

The combination of the image data from the separate images of the image sequence for forming the final fingerprint image may as indicated above be based on an averaging of pixel values (for each corresponding pixel of the fingerprint image). The images may also be fused together in other ways for forming the combined final fingerprint image, all with the purpose of improving the fingerprint image. Thus, the final fingerprint image will be a combination of data from all of the images acquired and comprising fingerprint image data.

Figure 5:
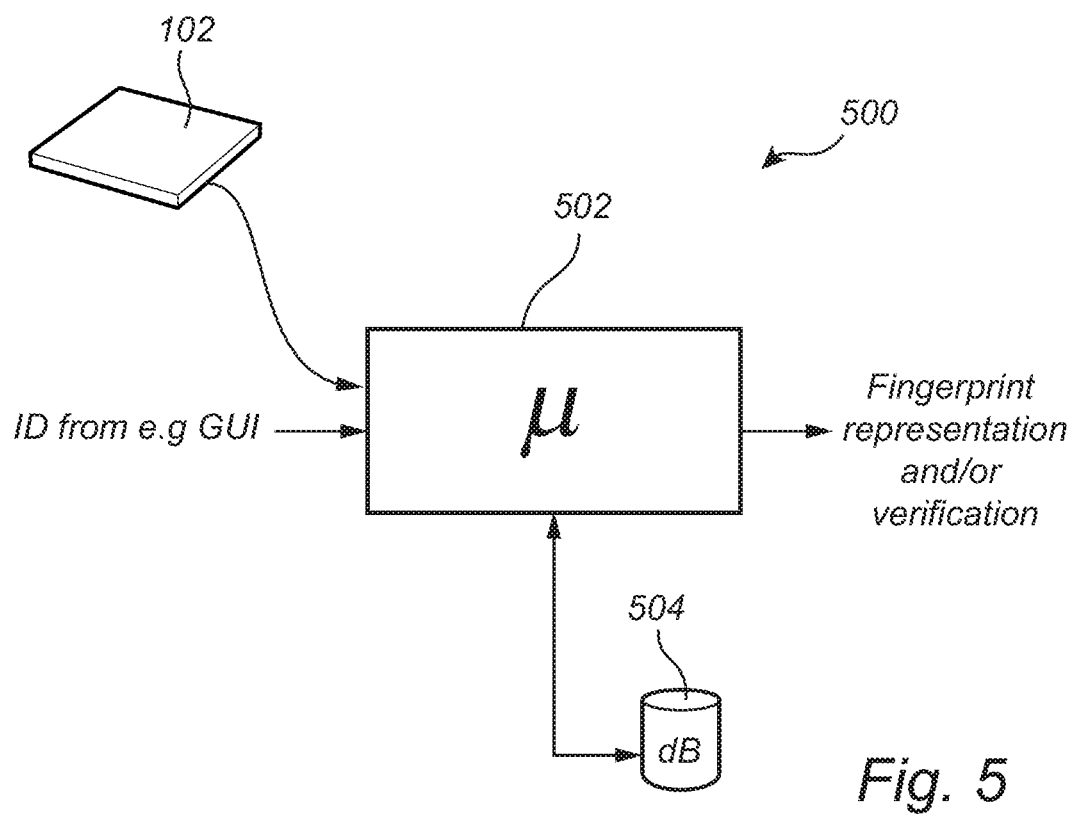
FIG. 5 conceptually illustrates a fingerprint sensing system according to a currently preferred embodiment of the invention.

In accordance with the invention, the fingerprint sensor 102 and the operation for acquiring a fingerprint image is achieved using a conceptualized fingerprint sensor system 500 as is illustrated in FIG. 5. The fingerprint sensor system 500 in turn, typically, forms part of the electronic device/mobile as is exemplified in FIG. 1.

The fingerprint sensor system 500 comprises the fingerprint sensor 102 and a processing circuitry, such as a control unit 502 for controlling the fingerprint sensor 102. The fingerprint sensor system 500 further comprises a memory, such as a database 504. The control unit 502 may each include a microprocessor, microcontroller, programmable digital signal processor or another programmable device. The control unit 502 may also, or instead, each include an application specific integrated circuit, a programmable gate array or programmable array logic, a programmable logic device, or a digital signal processor. Where the control unit 502 includes a programmable device such as the microprocessor, microcontroller or programmable digital signal processor mentioned above, the processor may further include computer executable code that controls operation of the programmable device. It should be understood that all or some parts of the functionality provided by means of the control unit 502 (or generally discussed as "processing circuitry") may be at least partly integrated with the fingerprint sensor 502.

Figure 6:
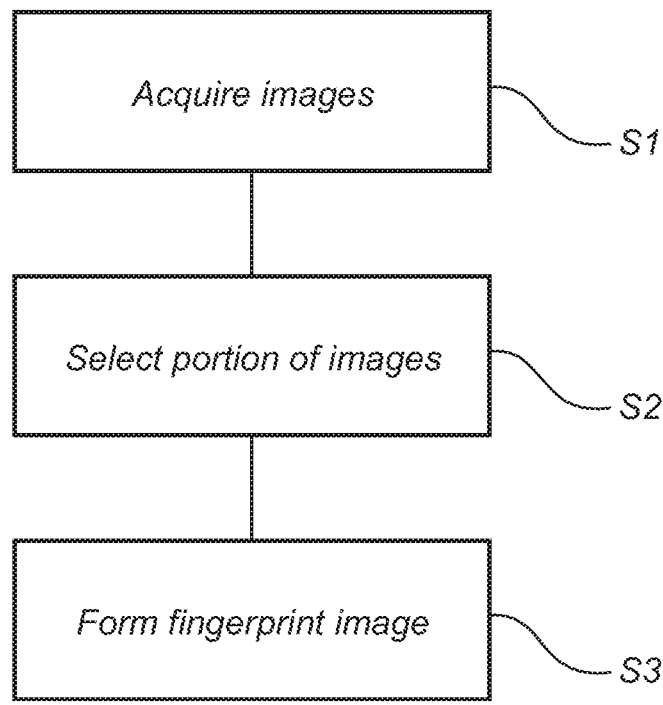
FIG. 6 is a flowchart disclosing the exemplary steps of the invention typically performed in conjunction with the fingerprint sensing system of FIG. 4.

During operation of the fingerprint sensor system 500, with further reference to FIG. 6, the fingerprint sensor system 500 is arranged to acquire, S1, a sequence of images of the finger at different stages of depression of the finger when the finger is contacting the fingerprint touch sensor 102. As explained above, the images are preferably acquired close in time of when the finger makes initial contact with the fingerprint sensor 102. However, by only selecting, S2, a portion of the sequence of images, where the selected portion of images all comprises information illustrating the finger, it is possible to exclude e.g. "empty" images captured for example before the finger has made enough contact with the finger. Once a portion of the acquired images have been selected, these images are used for forming, S3, the fingerprint image by combining fingerprint image information comprised with the selected portion of images of the finger.

The formed fingerprint image 400, 400' may then be further processed and used by the fingerprint system 500. Such processing may include further image enhancement. The formed fingerprint image 400, 400' is further typically used for enrolling the finger and subsequent authentication of the finger.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method of forming a fingerprint image of a finger by means of a fingerprint sensing system comprising a fingerprint touch sensor and processing circuitry connected to the fingerprint touch sensor, wherein the method comprises the steps of:
   acquiring a sequence of images of the finger at different stages of depression of the finger when the finger is contacting the fingerprint touch sensor, the sequence of images including a first acquired image and at least one later acquired image;
   selecting a portion of each image of the sequence of images, wherein the selected portion of each image includes information illustrating the finger and wherein the selected portion corresponding to the first acquired image comprises a central portion of the finger and the selected portion corresponding to the at least one later acquired image comprises an outer portion of the finger relative to the central portion; and
   forming the fingerprint image by combining fingerprint image information from each of the selected portions.

2. The method according to claim 1, wherein the sequence of images are consecutively acquired within a time frame defined by a single event of the finger being placed onto the fingerprint touch sensor.

3. The method according to claim 1, the step of forming the fingerprint image comprises:
   fusing the fingerprint image information from the selected portions.

4. The method according to claim 1, wherein each of the images comprises a plurality of pixels and the step of forming the fingerprint image comprises:
   forming a summarized value for each corresponding pixel of the selected portions.

5. The method according to claim 1, wherein the fingerprint image information from each of the selected portions contributes positively to the formed fingerprint image.

6. The method according to claim 1, wherein the sequence of images are full images of the finger acquired by the fingerprint touch sensor.

7. The method according to claim 1, wherein a sensor setting for the fingerprint sensor is the same when acquiring all of the images in the sequence of images.

8. A fingerprint sensing system, comprising:
   a fingerprint touch sensor;
   a memory; and
   processing circuitry connected to the fingerprint sensor for performing the method of claim 1.

9. The fingerprint sensing system according to claim 8, wherein a sensor setting for the fingerprint sensor is the same when acquiring all of the images in the sequence of images.

10. An electronic device comprising:
    the fingerprint sensing system according to claim 8; and
    a device controller for:
       performing an authentication of the finger based on the at least one selected fingerprint image, and
       performing at least one action only if the authentication indicates an authentication success.

11. The electronic device according to claim 10, wherein the electronic device is a mobile phone.

12. A computer program product comprising a non-transitory computer readable medium having stored thereon computer program means for controlling a portable electronic device, the portable electronic device comprising a fingerprint sensing system including a fingerprint touch sensor and processing circuitry, the fingerprint sensing system adapted to form a fingerprint image of a finger, wherein the computer program product comprises:
    code for acquiring a sequence of images of the finger at different stages of depression of the finger when the finger is contacting the fingerprint touch sensor, the sequence of images including a first acquired image and at least one later acquired image;
    code for selecting a portion of each image of the sequence of images, wherein the selected portion of each image includes information illustrating the finger and wherein the selected portion corresponding to the first acquired image comprises a central portion of the finger and the selected portion corresponding to the at least one later acquired image comprises an outer portion of the finger relative to the central portion; and
    code for forming the fingerprint image by combining fingerprint image information from each of the selected portions.

13. The computer program product according to claim 12, wherein a sensor setting for the fingerprint sensor is the same when acquiring all of the images in the sequence of images.

14. A method of forming a fingerprint image of a finger by means of a fingerprint sensing system comprising a fingerprint touch sensor and processing circuitry connected to the fingerprint touch sensor, wherein the method comprises the steps of:
- acquiring a sequence of images of the finger at different stages of depression of the finger when the finger is contacting the fingerprint touch sensor, the sequence of images including a first acquired image and at least one later acquired image;
- selecting a portion of each image of the sequence of images, wherein the selected portion of each image includes information illustrating the finger and wherein the selected portion corresponding to the first acquired image comprises a central portion of the finger and the selected portion corresponding to the at least one later acquired image comprises an outer ring of the finger relative to the central portion; and
- forming the fingerprint image by combining fingerprint image information from each of the selected portions.

15. A fingerprint sensing system, comprising:
a fingerprint touch sensor;
a memory; and
processing circuitry connected to the fingerprint sensor for performing the method of claim 14.

16. An electronic device comprising:
the fingerprint sensing system according to claim 15; and
a device controller for:
- performing an authentication of the finger based on the at least one selected fingerprint image, and
- performing at least one action only if the authentication indicates an authentication success.

* * * * *